US006494626B1

(12) United States Patent
Nakagawa

(10) Patent No.: US 6,494,626 B1
(45) Date of Patent: Dec. 17, 2002

(54) FOCAL PLANE SHUTTER

(75) Inventor: Tadashi Nakagawa, Narashino (JP)

(73) Assignee: Seiko Precision Inc. (JP)

( * ) Notice: Subject to any disclaimer, the term of this patent is extended or adjusted under 35 U.S.C. 154(b) by 0 days.

(21) Appl. No.: 09/652,184

(22) Filed: Aug. 31, 2000

(30) Foreign Application Priority Data

Aug. 31, 1999 (JP) ........................................... 11-244550

(51) Int. Cl.[7] .................................................. G03B 9/00
(52) U.S. Cl. ........................ 396/463; 396/238; 396/357; 396/456
(58) Field of Search ............................... 396/463, 475, 396/481, 456, 213, 238, 357

(56) References Cited

U.S. PATENT DOCUMENTS 3,955,209 A * 5/1976 Akiyama .................... 396/465
4,110,772 A * 8/1978 Nakagawa et al. ......... 396/456
4,332,452 A * 6/1982 Nakano et al. ............. 396/465

* cited by examiner

Primary Examiner—Russell Adams
Assistant Examiner—Michelle Nguyen
(74) Attorney, Agent, or Firm—Adams & Wilks

(57) ABSTRACT

A focal plane shutter capable of carrying out electric automatic exposure control and mechanical manual exposure control comprises a selecting member for selecting an automatic exposure position and a plurality of exposure time period positions, a switching member operated by the selecting member for switching a mechanical exposure time period control mechanism in correspondence with respective exposure time period positions, an electromagnetic device for electrically driving the switching member, and an electronic circuit for controlling the electromagnetic device. In operation, when the selecting member is disposed at the automatic exposure position, the switching member is controlled to be driven by the electromagnetic device, and when the selecting member is disposed at an exposure time period position, the switching member is driven by the selecting member.

3 Claims, 5 Drawing Sheets

FOCAL PLANE SHUTTER

BACKGROUND OF THE INVENTION

The present invention relates generally to a focal plane shutter for a camera, and more particularly to a focal plane shutter capable of carrying out electric automatic exposure control and mechanical manual exposure control.

Before the advent of a focal plane shutter capable of carrying out electric automatic exposure control, as disclosed in Japanese Utility Model Laid-Open No. 70533/1979 and the like, exposure control was carried out mechanically by using a governor, gears, levers, springs and the like. After electric automatic exposure control was developed, by switching on a power source such as a battery in a camera, a member of the camera such as a shutter could be driven by using a motor or an electromagnet utilizing power from the battery.

A focal plane shutter capable of carrying out electric automatic exposure control enables a photographing operation by a single-lens reflex camera achieving high function in an extremely simple and convenient manner by electrically driving a motor or an electromagnet and therefore, at present, the focal plane shutter is adopted in almost all of single-lens reflex cameras. However, when the battery is consumed, the focal plane shutter becomes inoperable and therefore, when taking the camera on a photographing trip over a long period of time, spare batteries are needed, which is inconvenient.

On the other hand, in the case of a focal plane shutter capable of carrying out mechanical manual exposure control, it is not necessary to take consumption of the battery into consideration, and such a focal plane shutter is used easily by some users. However, some degree of skill and experience is needed in operating such a focal plane shutter and accordingly, it is inconvenient for a person who is not accustomed to use such a camera.

SUMMARY OF THE INVENTION

An object of the present invention is to provide a focal plane shutter which overcomes the aforesaid drawbacks and which enables either mechanical manual exposure control or electric automatic exposure control to be selected as needed.

According to an aspect of the present invention, there is provided a focal plane shutter comprising an exposure time period control mechanism for controlling an exposure time period by successively operating an opening member and a closing member, a selecting member for selecting an automatic exposure position and a plurality of exposure time period positions, a switching member operated by the selecting member for switching the exposure time period control mechanism in correspondence with a desired one of the exposure time period positions, and electromagnetic driving means for electrically driving the switching member, wherein when the selecting member is disposed at the automatic exposure position, the switching member is driven by the electromagnetic driving means and when the selecting member is disposed at the exposure time period positions, the switching member is driven by the selecting member.

DETAILED DESCRIPTION OF THE INVENTION

A detailed explanation will be given of one embodiment of the invention with reference to the drawings.

Figure 1:
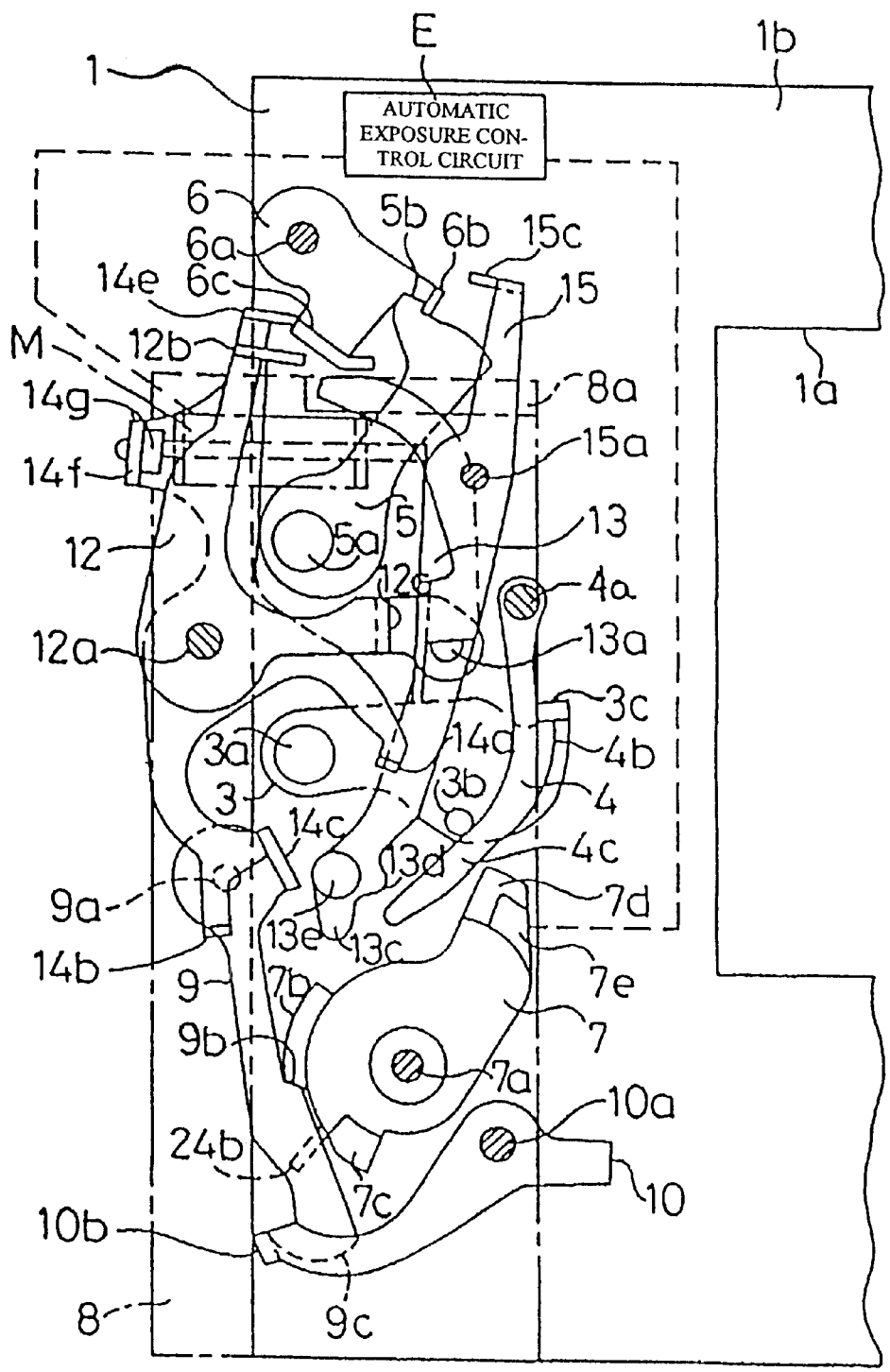
FIG. 1 is a plan view of portions of a shutter according to an embodiment of the invention.

In FIG. 1, a shutter base plate 1 is formed with a shutter opening 1a for exposure, and the shutter opening 1a is covered by an opening shutter vane or blade (not illustrated). Further, a closing shutter vane or blade (not illustrated) is contained at an upper end portion 1b of the opening 1a and is on standby for completing the exposure. The respective vanes are supported to be operable in a plane in parallel with a receiving plate (not illustrated) having a shape similar to that of the shutter base plate 1 and supported in parallel with the shutter base plate 1.

An opening member 3 is provided at the shutter base plate 1 pivotably mounted on a shaft 3a and is urged in the clockwise direction by a spring (not illustrated). A pin 3b projects upwardly at a right lower portion of the opening member 3, and a curved portion 3c projects upwardly at a right end portion thereof. The opening member 3 is connected with the opening vane (not illustrated) to operate the opening vane in a manner well known in the art.

An opening claw 4 is provided at the base plate 1 pivotably mounted on a shaft 4a and is urged in the counterclockwise direction by a spring (not illustrated). The opening claw 4 is provided with a projection 4c which extends in the lower direction. Further, the opening claw 4 locks the curved portion 3c of the opening member 3 by a hook portion 4b to thereby lock the opening member 3 at a charged position.

A closing member 5 is provided at the shutter base plate 1 pivotably mounted on a shaft 5a and is urged in the clockwise direction by a spring (not illustrated). The closing member 5 is formed with a hook portion 5b at a right end portion thereof and is connected to the closing vane (not illustrated) to operate the closing vane in a manner well known in the art.

A closing claw 6 is provided at the shutter base plate 1 pivotably mounted on a shaft 6a and is urged in the clockwise direction by a spring (not illustrated). The closing claw 6 is provided with a curved portion 6b for locking the hook portion 5b of the closing member 5 at a charged position and an operational curved portion 6c which can be brought into contact with a first arm 13b of a cooperatively-moved lever 13, described later.

A control member 7 is provided at the shutter base plate 1 pivotably mounted on a shaft 7a and is urged in the counterclockwise direction by a biasing spring (not illustrated). The control member 7 is provided with a stepped portion 7b having an inclined face, a pressing portion 7c which projects upwardly, a projection 7d engageable with the projection 4c of the opening claw 4 and a pressing portion 7e projecting upward from the projection 7d.

A control base plate 8 is fixed to the shutter base plate 1 to thereby cover the above-described members, and the control base plate 8 is formed with a raised shelf portion 8a orthogonal to planes of operating the above-described members. The control base plate 8 is partially opened such that operation of the above-described members and the members described below is not hampered.

A control claw 9 is provided at a rear face of the control base plate 8 pivotably mounted on a shaft 9a and is urged in the counterclockwise direction by a spring (not illustrated). The control claw 9 is provided with an inclined face 9b for constraining the stepped portion 7b of the control member 7 at a charged position and a claw portion 9c engageable with a release lever 10, described later.

The release lever 10 is provided at the control base plate 8 pivotably mounted on a shaft 10a and is urged in the counterclockwise direction by a spring (not illustrated). The release lever 10 is provided with a curved portion 10b for locking the claw portion 9c of the control claw 9 to constrain the control member 7 at a charged position (the illustrated position) by being brought into contact with a stop piece (not illustrated).

Although not illustrated, a camera main body is provided with an exposure time period selecting member capable of selecting respective shutter speeds from 1 second to 1/1000 second and states of a bulb shutter and AUTO, and the state of the shutter is switched by operating the exposure time period selecting member. Cam members 11a, 11b and 11c for switching an exposure time period control mechanism in cooperation with the exposure time period selecting member are attached to the shelf portion 8a of the control base plate 8 in a manner well known in the art pivotably around a shaft lid (refer to FIG. 2).

Figure 3:
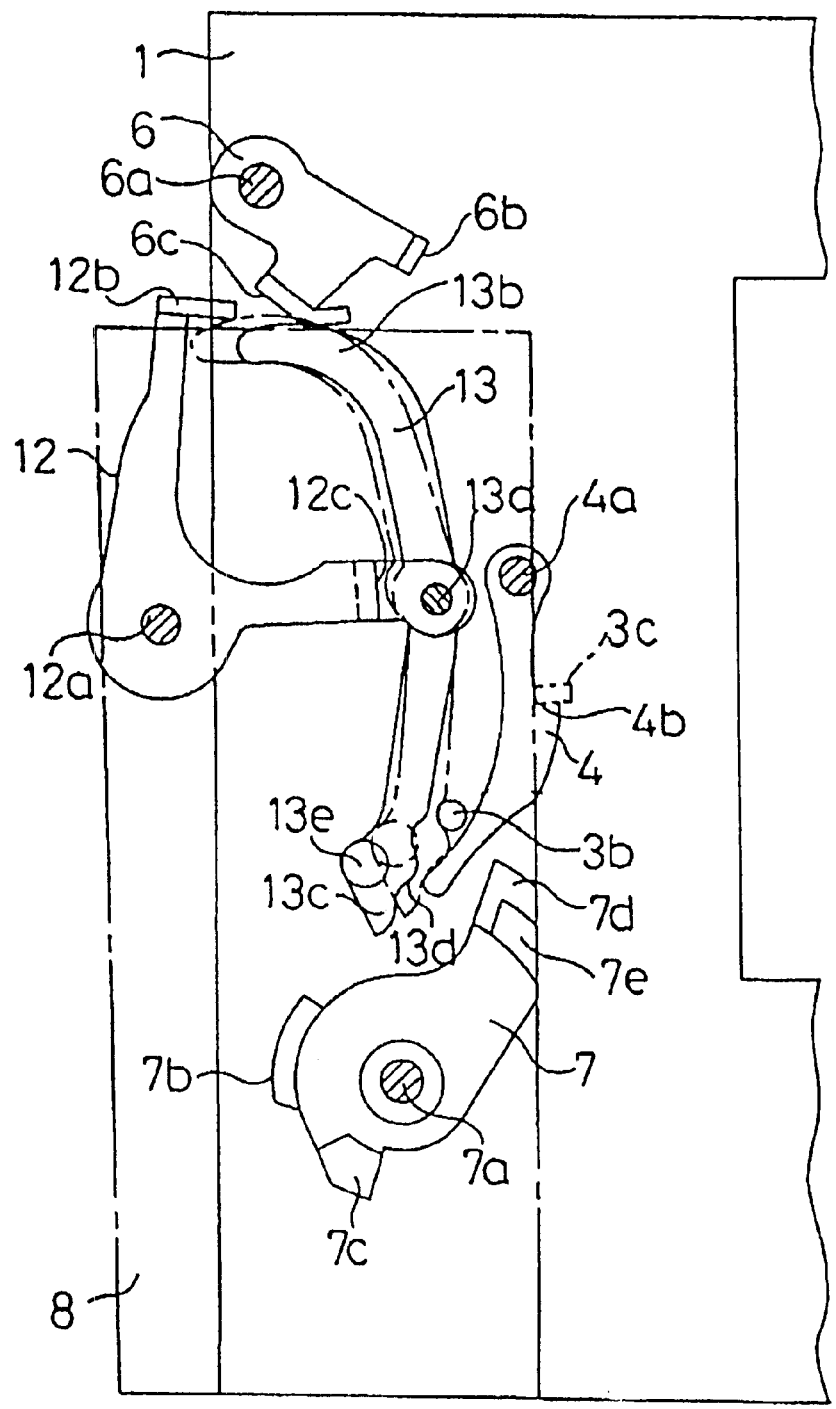
FIG. 3 is an explanatory view of portions of the shutter according to the invention.

An adjusting lever 12 is provided at the control base plate 8 pivotably mounted on a shaft 12a and urged in the clockwise direction by a spring (not illustrated). The adjusting lever 12 is provided with a curved portion 12b which is brought into contact with the cam member 11c and an arm 12c extending to the right side. A front end portion of the arm 12c is bent in the lower direction and axially supports the cooperatively-moved lever 13 pivotably by a shaft 13a at the rear face of the control base plate 8 (refer to FIG. 3).

The cooperatively-moved lever 13 is provided with the first arm 13b engaged with the operation curved portion 6c of the closing claw 6, a second arm 13c and a projected portion 13d which are engageable with the pin 3b of the opening member 3, and a pin 13e engageable with the projection 7d of the control member 7. The cooperatively-moved lever 13 is supported downward from the opening claw 4 and accordingly, the cooperatively-moved lever 13 is operable such that the second arm 13c and the projection 4c do not interfere with each other.

The switching member 14 is provided at the control base plate 8 pivotably mounted on the shaft 12a and is urged in the clockwise direction by a spring (not illustrated). The switching member 14 is provided with a first arm 14a a front end portion of 3 which is bent, a second arm 14d having two curved portions 14b and 14c and a third arm 14e having a curved portion engaged with the cam member 11b.

Figure 5:
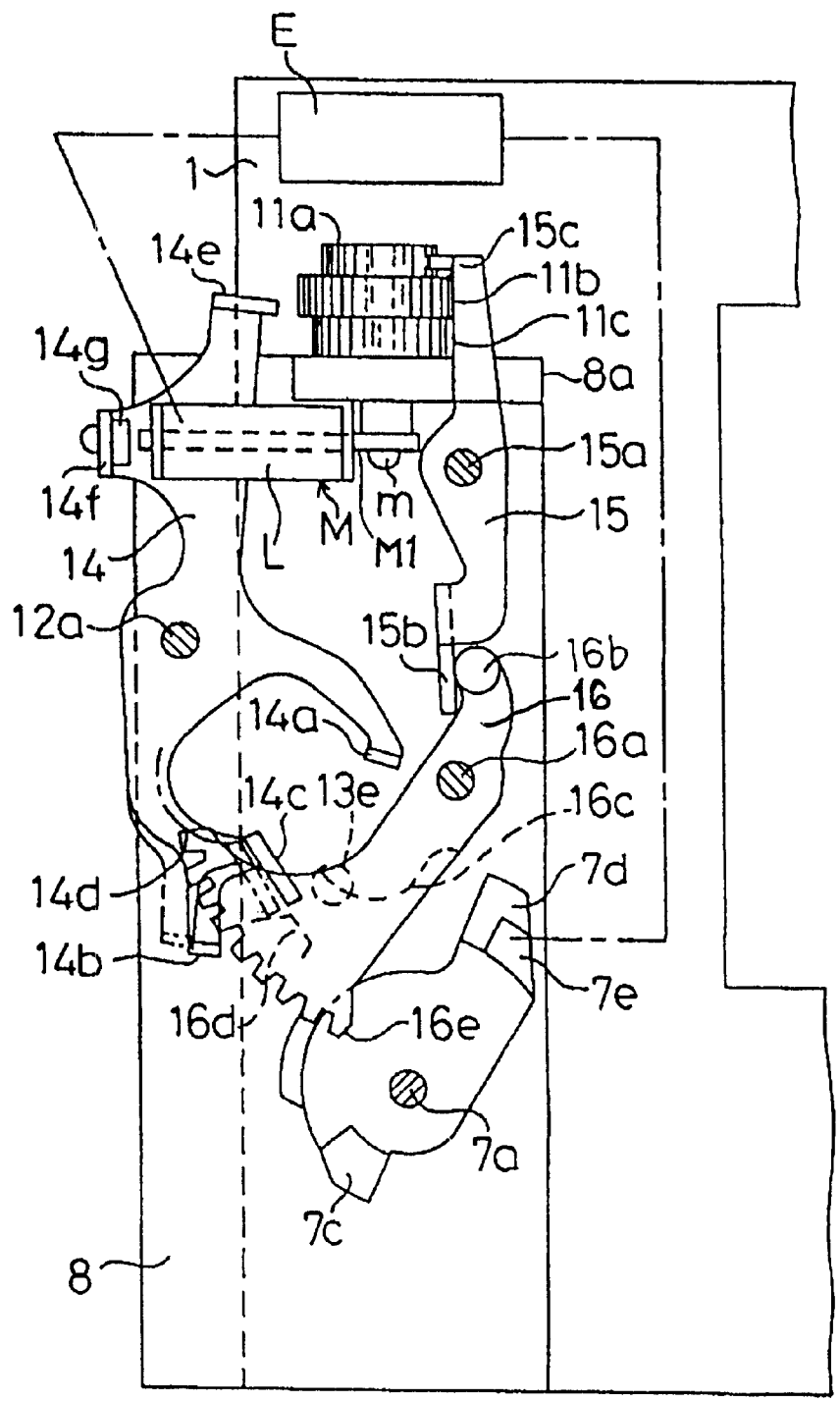
FIG. 5 is an explanatory view of portions of the shutter according to the invention.

A curved portion 14f is formed at a middle portion of the third arm 14e, and the curved portion 14f is attached with an electromagnetic attraction piece 14g with play therebetween. When the switching member 14 is pivoted in the clockwise direction from a state of FIG. 5, the electromagnetic attraction piece 14g is brought into press contact with an iron core M1 of an electromagnet M. The electromagnet M is provided at the control base plate 8 by fixing the iron core M1 to the shelf portion 8a of the control base plate 8 by a setscrew "m". The electromagnetic driving means is constituted by the electromagnetic attraction piece 14g and the electromagnet M.

The electromagnet M is wound with a coil L and is electrically connected to an automatic exposure control circuit E which is an electronic circuit. Driving of the automatic exposure control circuit E is carried out when an exposure time period selecting member is disposed at a position of AUTO. The automatic exposure control circuit E is stored with exposure data, and the automatic exposure control circuit E selects the exposure data in correspondence with data of brightness of an object to be photographed from light measuring means (not illustrated), conducts electricity to the coil L in correspondence with the selected exposure data and controls excitation of the electromagnet M.

An operating lever 15 is provided at the control base plate 8 pivotably mounted on a shaft 15a and is urged in the counterclockwise direction by a spring (not illustrated). The the operating lever 15 is provided with a lower curved portion 15b and a curved portion 15c which is brought into contact with the cam member 11a (refer to FIG. 5).

Figure 2:
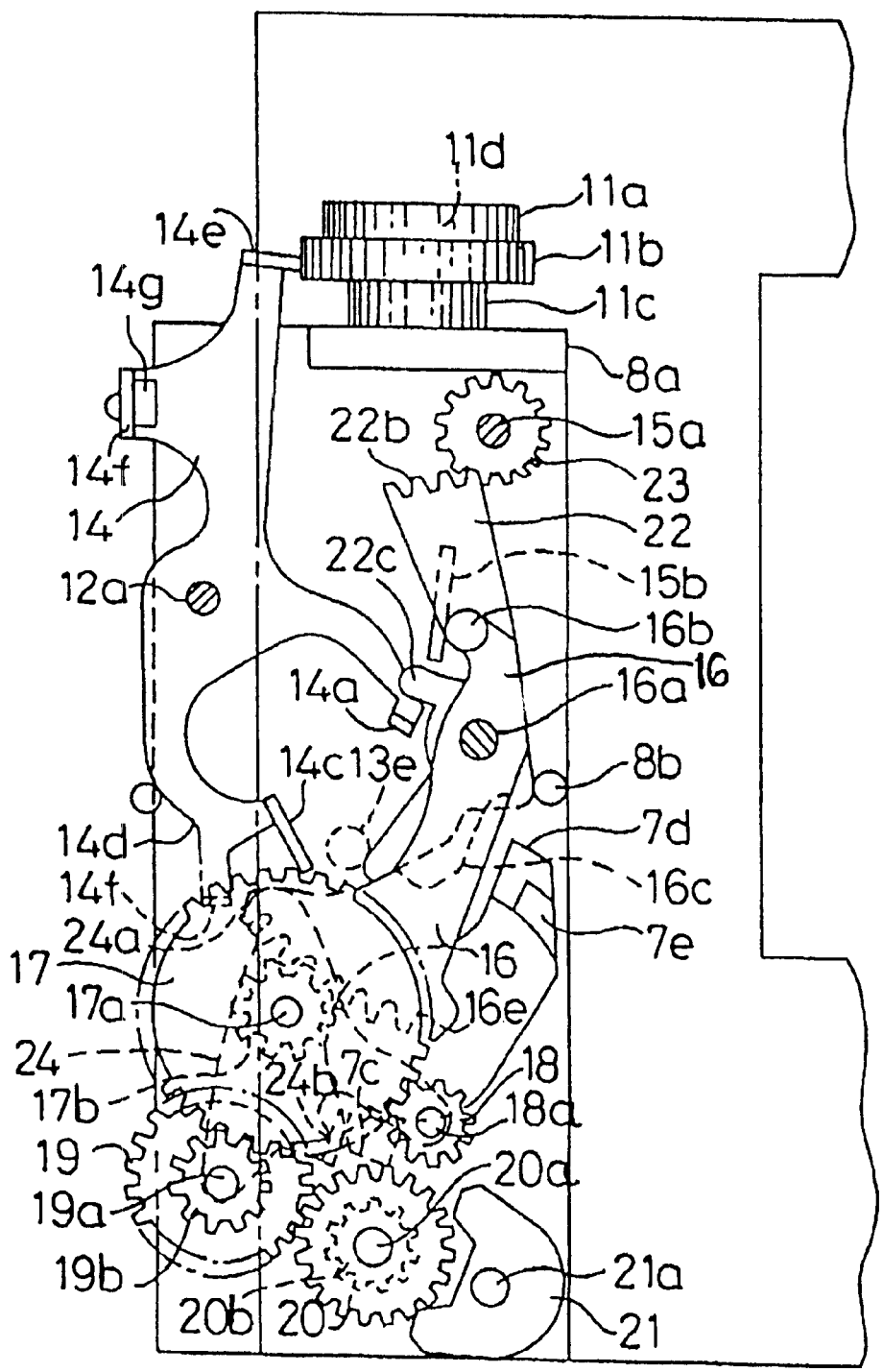
FIG. 2 is a plan view of a governor device of a shutter according to the embodiment of the invention.

As shown in FIG. 2, a governor device is constituted by a first gear 16, a second gear 17, a middle gear 18, a third gear 19, an escape wheel 20 and a pallet fork 21. A second governor device comprising an auxiliary gear 22 and a pinion 23 is also provided, as shown in FIG. 2.

The first gear 16 is provided at the control base plate 8 pivotably mounted on a shaft 16a and is provided with a projection 16b engaged with the curved portion 15b of the operating lever 15, a cam portion 16c provided at the rear face thereof and engageable with the pressing portion 7e of the control member 7, a projection 16d engageable with the curved portion 14c of the switching member 14 and provided at the rear face, and a teeth portion 16e at a lower outer periphery thereof. The first gear 16 urges the projection 16b thereof in a direction in which the projection 16b is brought into press contact with the curved portion 15b by a spring (not illustrated) provided between the projection 16b and the curved portion 15b. The cam portion 16c is formed in a shape drawing a curve as shown by a dotted line of FIG. 5 such that the cam portion 16c can be brought into contact with the pressing portion 7e of the control member 7 even when the first gear 16 is pivoted to some degree on the shaft 16a. Further, the projection 16d can be engaged with the curved portion 14c of the switching member 14, and a face of the projection 16d in contact with the curved portion 14c is inclined such that the curved portion 14c and the projection 16d can be disengaged from each other by pivoting the switching member 14 in the counterclockwise direction by pressing the curved portion 14c when the first gear 16 is pivoted in the clockwise direction.

The second gear 17 is provided with a teeth portion around its total periphery and is axially supported at the control base plate 8 pivotably by the shaft 17a to thereby form a pinion 17b in mesh with the teeth portion 16e. The second gear 17 is in mesh with the middle gear 18 and a pinion 19b formed at the third gear 19. The middle gear 18 and the third gear 19 are pivotably mounted on a shaft 18a and a shaft 19a, respectively, provided at a middle lever 24.

The middle lever 24 is provided at the control base plate 8 on the lower side of the second gear 17 pivotably mounted on the shaft 17a. The middle lever 24 is provided with a projection 24a engaged with the curved portion 14b of the switching member 14 and a curved portion 24b engaged with the pressing portion 7c of the control member 7, and the middle lever 24 is urged in the counterclockwise direction by a spring (not illustrated). Therefore, when the middle lever 24 is pivoted in the clockwise direction, the middle gear 18 and the third gear 19 are also pivoted in the clockwise direction, and the middle gear 18 becomes in mesh with the escape wheel 20. When the middle lever 24 is pivoted in the counterclockwise direction, positions of the middle gear 18 and the third gear 19 are also pivoted in the counterclockwise direction and the third gear 19 becomes in mesh with a pinion 20b.

The escape wheel 20 is provided at the control base plate 8 pivotably mounted on a shaft 20a. The escape wheel 20 has a teeth portion formed around its total periphery which can mesh with the middle gear 18 and which is always in mesh with the pallet fork 21. The escape wheel 20 is formed with the pinion 20b on its lower side and can mesh with the third gear 19 and in the illustrated charged state, the curved portion 24b of the middle lever 24 is pivoted in the clockwise direction by the pressing portion 7c of the control member 7 and accordingly, the third gear 19 and the middle gear 18 are not in mesh with either of the pinion 20b and the escape wheel 20. Therefore, in the charging operation, deceleration by the pallet fork 21 is not produced.

The pallet fork 21 is provided at the control base plate 8 pivotably mounted on a shaft 21a. Further, the manner in which the escape wheel 20 and the pallet fork 21 mesh with each other is well known and accordingly, a detailed description thereof will be omitted.

Figure 4:
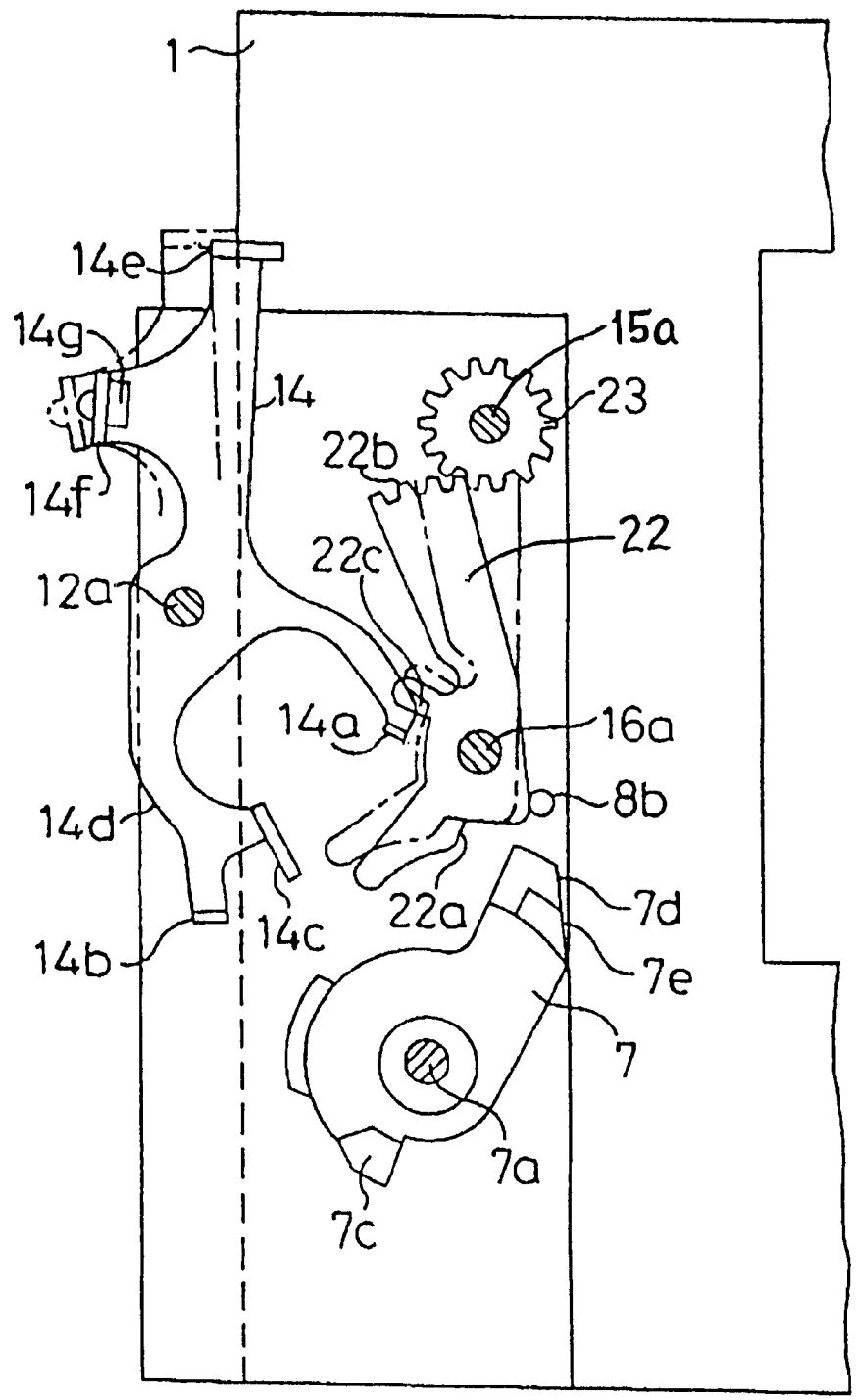
FIG. 4 is an explanatory view of portions of the shutter according to the invention.

As shown in FIG. 4, the auxiliary gear 22 is provided on the lower side of the first gear 16 pivotably mounted on a shaft 16a, urged in the counterclockwise direction by a spring (not illustrated), and is stopped by being brought into contact with a projection 8b provided at the control base plate 8. The auxiliary gear 22 is provided with a pressing arm 22a which is engageable with the projection 7d of the control member 7, an upper end teeth portion 22b, and a projection 22c engaged with the first arm 14a of the switching member 14.

The pinion 23 is in mesh with the teeth portion 22b of the auxiliary gear 22 and is turned or operated by the shaft 15a. The pinion 23 is supported at the control base plate 8 pivotably on the lower side of the lever 15.

By way of example, the illustrated state of the embodiment shows the charged state in which the exposure time period selecting member is set to the exposure time period in which the shutter speed is 1 second in the manual exposure control mode.

Next, an explanation will be given of a method of operating the shutter by the release operation of the camera.

When in cooperation with depressing the release button of the camera, the release lever 10 is pivoted in the clockwise direction on the shaft 10a against the urging force of the spring from the state of FIG. 1, the claw portion 9c locked by the curved portion lob is released. At the same time, the control member 7 starts pivoting in the counterclockwise direction on the shaft 7a by the urging force of the spring (not illustrated). The control claw 9 is pivoted in the clockwise direction on the shaft 9a against the urging force of the spring by the inclined face 9b being pressed by the stepped portion 7b of the control member 7.

Further, since the pressing portion 7c releases pressing of the curved portion 24b of the middle lever 24, the middle lever 24 is pivoted in the counterclockwise direction on the shaft 17a by the spring and is stopped by being brought into contact with a stop piece (not illustrated), at a position at which the third gear 19 and the gear 20b of the escape wheel 20 are correctly in mesh with each other.

Further, when the control member 7 is pivoted in the counterclockwise direction, the projection 7d presses the projection 4c of the opening claw 4, and the opening claw 4 is pivoted in the clockwise direction against the urging force of the spring on the shaft 4a until the lock portion 4b is unlocked or disengaged from the curved portion 3c thereby releasing the opening member 3.

When the opening member 3 is released, the urging force of the spring pivots the opening member 3 in the clockwise direction on the shaft 3a and operates the opening vane (not illustrated), to thereby release the opening la so as to start an exposure. In the state of FIG. 1, the pin 3b is not engaged with the projected portion 13d or the second arm 13c of the cooperatively-moved lever 13.

Further, when the control member 7 is pivoted further in the counterclockwise direction, the projection 7d engages with the pressing arm 22a of the auxiliary gear 22 shown in FIG. 2 and pivots the auxiliary gear 22 in the clockwise direction on the shaft 16a against the urging force of the spring. At the same time, the pressing portion 7e is engaged with the cam portion 16c at the rear face of the first gear 16, pivots the first gear 16 in the clockwise direction on the shaft 16a against the urging force of the spring, which in turn pivots the pinion 17b, the second gear 17, the pinion 19b, the third gear 19, the pinion 20b and the escape wheel 20 to thereby pivot the pallet wheel 21.

When the exposure time period of 1 second has elapsed, the pressing portion 7e escapes from the camming region where it presses the cam portion 16c and is instantaneously pivoted in the counterclockwise direction by the urging force of the spring, whereupon the projection 7d engages with the pin 13e and pivots the cooperatively-moved lever 13 in the clockwise direction on the shaft 13a.

When the pin 13e is pressed, the cooperatively-moved lever 13 presses the operational curved portion 6c of the closing claw 6 by the first arm 13b, pivots the closing claw 6 in the counterclockwise direction on the shaft 6a against the urging force of the spring, and unlocks or disengages the curved portion 6b from the hook portion 5b thereby releasing the closing member 5. When this state is reached, the control member 7 is stopped by being brought into contact with a stop piece (not illustrated).

When the closing member 5 is released, the closing member 5 is pivoted in the clockwise direction on the shaft 5a by the spring, operates the closing vane (not illustrated), and closes the opening la to thereby complete the exposure operation.

By the above-described operation, one exposure operation is performed and in order to again charge the shutter, the control member 7 is pivoted in the clockwise direction on the shaft 7a against the spring by means well known in the art, thereby disengaging the pressing portion 7e from the cam portion 16c of the first gear 16, releasing the pressing arm 22a of the auxiliary gear 22 and the pin 13e of the cooperatively-moved lever 13 from engagement with the projection 7d, and further, disengaging the pressing portion 7e from the projection 4c of the opening claw 4. Further pivotal movement of the control member 7 in the clockwise direction causes the pressing portion 7c to press the curved portion 24b of the middle lever 24 to thereby disengage the third gear 19 from the pinion 20b with the claw portion 9c locked by the curved portion 10b of the release lever 10 at a position at which the stepped portion 7b is constrained by the inclined face 9b of the control claw 9.

Simultaneously with pivoting the control member 7 in the clockwise direction, the opening member 3 and the closing member 5 are pivoted in the counterclockwise direction on the shafts 3a and 5a, respectively, against the springs, the opening vane and the closing vane are displaced to the charged positions such that the opening 1a is not opened and the curved portion 3c is locked by the hook portion 4b of the open claw 4, and the hook portion 5b is locked by the curved portion 6b of the closing claw 6 to thereby finish the shutter charging operation. When the charging operation is finished, the shutter returns to the illustrated charge state in readiness for the next exposure operation.

Although a detailed explanation of the operation will be omitted with regard to the case in which the exposure time period is from ½ through $\frac{1}{1000}$ second, it should be noted that by means of the cam members 11a, 11b and 11c, the operating lever 15, the switching member 14 and the adjusting lever 12 are adjusted in correspondence with the desired exposure time period. That is, the operating lever 15 adjusts an amount of operating the escape wheel 20 from the governor device (refer to FIG. 5), the switching member 14 switches wheel trains of the governor device (refer to FIG. 2 and FIG. 4) and the adjusting lever 12 adjusts the extent of movement of the cooperatively-moved lever 13 (refer to FIG. 3).

Next, in the case of automatic exposure control, the exposure time period selecting member is aligned to the position of AUTO. Thereby, the cam members 11a, 11b and 11c are aligned to the automatic exposure positions, and the operating lever 15 is pivoted in the counterclockwise direction and presses the projection 16b by the curved portion 15b and pivots the first gear 16 in the clockwise direction. Further, the switching member 14 is pivoted in the clockwise direction, the magnetic attraction portion 14g is brought into contact with the electromagnet M, and the curved portion 14c is moved to the region of operating the lower projection 16d of the first gear 16. Therefore, the first gear 16 becomes inoperable provided the switching member 14 is not moved. At the same time, the power source is connected to the automatic exposure control circuit E.

Next, an explanation will be given of a method of operating the shutter in the automatic exposure control mode. In cooperation with depressing the release button of the camera, the brightness data of the object being photographed is transmitted from the light measuring device to the automatic exposure control circuit E. When the exposure data corresponding to the data is read and electricity is conducted to the coil L, the electromagnet M is excited, attracts and holds the magnetic attraction piece 14g and renders the switching member 14 immovable.

Successively, when the shutter is released, the control member 7 starts pivoting in the counterclockwise direction by the spring (not illustrated), presses the projection 4c of the opening claw 4, releases engagement with the hook portion 4b and the curved portion 3c and pivots the opening member 3 by the spring to thereby start an exposure operation. Further, simultaneously with driving the control member 7, the automatic exposure control circuit E for exposure control starts counting time. Meanwhile, when the control member 7 is pivoted further in the counterclockwise direction and is brought into contact with the cam portion 16c of the first gear 16, since the first gear 16 is inoperable because operation of the projection 16d is constrained by the curved portion 14c of the switching member 14, the control member 7 is releasably locked at that position.

When time counting reaches a desired exposure time period in correspondence with the brightness of the object being photographed, the automatic exposure control circuit E interrupts electricity conduction to the magnet M and demagnetizes the electromagnet M. At this occasion, the control member 7 exerts a force of pivoting in the clockwise direction to the first gear 16 via the cam portion 16c and the contact portion of the projection 16d is inclined such that the projection 16d avoids the curved portion 14c and therefore, the control member 7 is pivoted by pivoting the switching member 14 in the counterclockwise direction. Further, by the projection 7d of the control member 7, the pin 13e is pressed and the cooperatively-moved lever 13 is pivoted in the clockwise direction. By pivoting the cooperatively-moved lever 13, the first arm 13b presses the operational curved portion 6c and pivots the closing claw 6 in the clockwise direction. Therefore, engagement of the curved portion 6b and the hook portion 5b is released and the closing member 5 is pivoted in the clockwise direction by the spring force to thereby complete the exposure operation.

Although according to this embodiment, the switching member 14 constrains operation of the control member 7 via the first gear 16, the invention is not limited thereto. That is, there can be constructed also a shutter in which the switching member 14 constrains operation of the closing claw 6 or the first arm 13b of the cooperatively-moved lever 13. Further, although the electromagnetic driving means is constituted by the electromagnet and the magnetic attraction piece, the invention is not limited thereto but a solenoid or the like may be adopted.

The shutter of the invention is constructed such that there is provided electromagnetic driving means capable of electrically driving the switching member for switching the exposure time period control mechanism to correspond to the desired exposure time control position, and electric automatic exposure control can also be carried out. Therefore, a camera can be provided which is capable of carrying out mechanical manual exposure control and electrical automatic exposure control by an extremely simple construction.

I claim:

1. A focal plane shutter comprising: an exposure time period control mechanism for carrying out an automatic exposure control and a manual exposure control to control the opening movement of an opening member and the closing movement of a closing member to thereby control an exposure time period; and a switching member engageable with a set of cams having different camming profiles to switch the exposure time period control mechanism so as to selectively carry out the automatic exposure control or the manual exposure control.

2. A focal plane shutter according to claim 1; wherein the switching member is pivotably mounted and has a first portion engageable-with the set of cams and a second portion attractable by an electromagnet, wherein energization of the electromagnet attracts the second portion of the switching member thereby pivoting the switching member to disengage the first portion of the switching member from the set of cams.

3. A focal plane shutter according to claim 2; including at least one governor device coacting with the switching member for controlling the exposure time period; wherein the switching member is pivotably mounted and has a first portion engageable with the set of cams and a second portion attractable by an electromagnet, wherein energization of the electromagnet attracts the second portion of the switching member thereby pivoting the switching member to disengage the first portion of the switching member from the set of cams.

* * * * *